United States Patent [19]
Nonaka et al.

[11] Patent Number: 5,101,340
[45] Date of Patent: Mar. 31, 1992

[54] SYSTEM FOR GRAPHICALLY INDICATING THE ROUTING AND TIME RELATIONSHIPS BETWEEN JOBS FORMING A PROCESS

[75] Inventors: Hisanori Nonaka, Hitachi; Toru Mitsuta, Hitachiohta; Yasuhiro Kobayashi, Katsuta, all of Japan

[73] Assignee: Hitachi, Ltd., Tokyo, Japan

[21] Appl. No.: 340,004
[22] PCT Filed: Aug. 3, 1988
[86] PCT No.: PCT/JP88/00774
§ 371 Date: Apr. 7, 1989
§ 102(e) Date: Apr. 7, 1989
[87] PCT Pub. No.: WO89/01667
PCT Pub. Date: Feb. 23, 1989

[30] Foreign Application Priority Data
Aug. 7, 1987 [JP] Japan ............... 62-197347

[51] Int. Cl.⁵ ............... G06F 15/419
[52] U.S. Cl. ............... 395/650; 364/281.3; 364/264; 364/264.7; 364/DIG. 1
[58] Field of Search ............... 364/200, 900

[56] References Cited
U.S. PATENT DOCUMENTS

| | | | |
|---|---|---|---|
| 3,474,240 | 10/1969 | Marquis | 364/402 |
| 4,210,962 | 7/1980 | Marsh | 364/156 |
| 4,660,166 | 4/1987 | Hopfield | 364/513 |
| 4,698,751 | 10/1987 | Parvin | 364/402 |
| 4,769,772 | 9/1988 | Dwyer | 364/200 |
| 4,821,220 | 4/1989 | Duisberg | 364/578 |
| 4,885,684 | 12/1989 | Austin | 364/200 |
| 4,894,773 | 1/1990 | Lagarias | 364/402 |
| 4,894,774 | 1/1990 | McCarthy | 364/410 |

OTHER PUBLICATIONS

Business Procedure, ch. 3, Application to Management Plans, pp. 6-49, 6-52.

*Primary Examiner*—Thomas C. Lee
*Assistant Examiner*—Eric Coleman
*Attorney, Agent, or Firm*—Antonelli, Terry Stout & Kraus

[57] ABSTRACT

An operation process indicating method comprising expressing each job in the form of a segment which is parallel to a time axis and whose end points are two points having the earliest start time and latest completion time of the job as their respective time coordinates, and connecting the earliest start time point on the segment and the latest completion time point on the segment expressive of the job preceding the first-mentioned job, with a segment, thereby to create and indicate an operation process chart. The operation process indicating method is useful as an aiding method for the operations of creating and revising an operation process in the case of operation planning.

5 Claims, 22 Drawing Sheets

| NAME OF JOB | WORKING PERIOD OF TIME (DAYS) | NAME OF PRECEDING JOB |
|---|---|---|
| a | 4 | — |
| b | 5 | — |
| c | 2 | — |
| d | 5 | a |
| e | 5 | a |
| f | 6 | b |
| g | 5 | b |
| h | 9 | c |
| i | 6 | c |
| j | 3 | d |
| k | 8 | d |
| l | 5 | f k |
| m | 2 | e, g, i |

FIG. 5

| SERIAL NO. OF ATTRIBUTE OF JOB | NAME OF ATTRIBUTE OF JOB | CONTENT |
|---|---|---|
| 1 | JOB NAME | NAME GIVEN TO JOB |
| 2 | PRECEDING JOB NAME | NAME OF JOB PRECEDING CERTAIN JOB |
| 3 | SUCCEEDING JOB NAME | NAME OF JOB PRECEDED BY CERTAIN JOB |
| 4 | FRONT COUPLING POINT NAME | NAME OF COUPLING POINT BETWEEN CERTAIN JOB AND ITS PRECEDING JOB |
| 5 | REAR COUPLING POINT NAME | NAME OF COUPLING POINT BETWEEN CERTAIN JOB AND ITS SUCCEEDING JOB |
| 6 | WORKING PERIOD OF TIME | PERIOD OF TIME REQUIRED TILL COMPLETION OF CERTAIN JOB |
| 7 | JOB START TIME | TIME AT WHICH CERTAIN JOB IS STARTED |
| 8 | JOB COMPLETION TIME | TIME AT WHICH CERTAIN JOB IS COMPLETED |
| 9 | EARLIEST START TIME | EARLIEST VALUE OF JOB START TIME OF CERTAIN JOB |
| 10 | LATEST COMPLETION TIME | LATEST VALUE OF JOB COMPLETION TIME OF CERTAIN JOB |
| 11 | y-COORDINATE | y-COORDINATE FOR DISPLAYING CERTAIN JOB |

FIG. 6

| SERIAL NO. OF ATTRIBUTE OF COUPLING POINT | NAME OF ATTRIBUTE OF COUPLING POINT | CONTENT |
|---|---|---|
| 1 | COUPLING POINT NAME | NAME GIVEN TO COUPLING POINT |
| 2 | PRECEDING COUPLING POINT NAME | NAME OF FRONT COUPLING POINT OF JOB HAVING CERTAIN COUPLING POINT AS REAR COUPLING POINT |
| 3 | SUCCEEDING COUPLING POINT NAME | NAME OF REAR COUPLING POINT OF JOB HAVING CERTAIN COUPLING POINT AS FRONT COUPLING POINT |
| 4 | PRECEDING JOB NAME | NAME OF JOB HAVING CERTAIN COUPLING POINT AS REAR COUPLING POINT |
| 5 | SUCCEEDING JOB NAME | NAME OF JOB HAVING CERTAIN COUPLING POINT AS FRONT COUPLING POINT |
| 6 | EARLIEST TIME | EARLIEST TIME AT WHICH CERTAIN COUPLING POINT CAN EXIST |
| 7 | LATEST TIME | LATEST TIME AT WHICH CERTAIN COUPLING POINT CAN EXIST |
| 8 | COUPLING POINT TIME | ACTUAL TIME AT WHICH CERTAIN COUPLING POINT EXISTS |
| 9 | y-COORDINATE | y-COORDINATE FOR DISPLAYING CERTAIN COUPLING POINT |

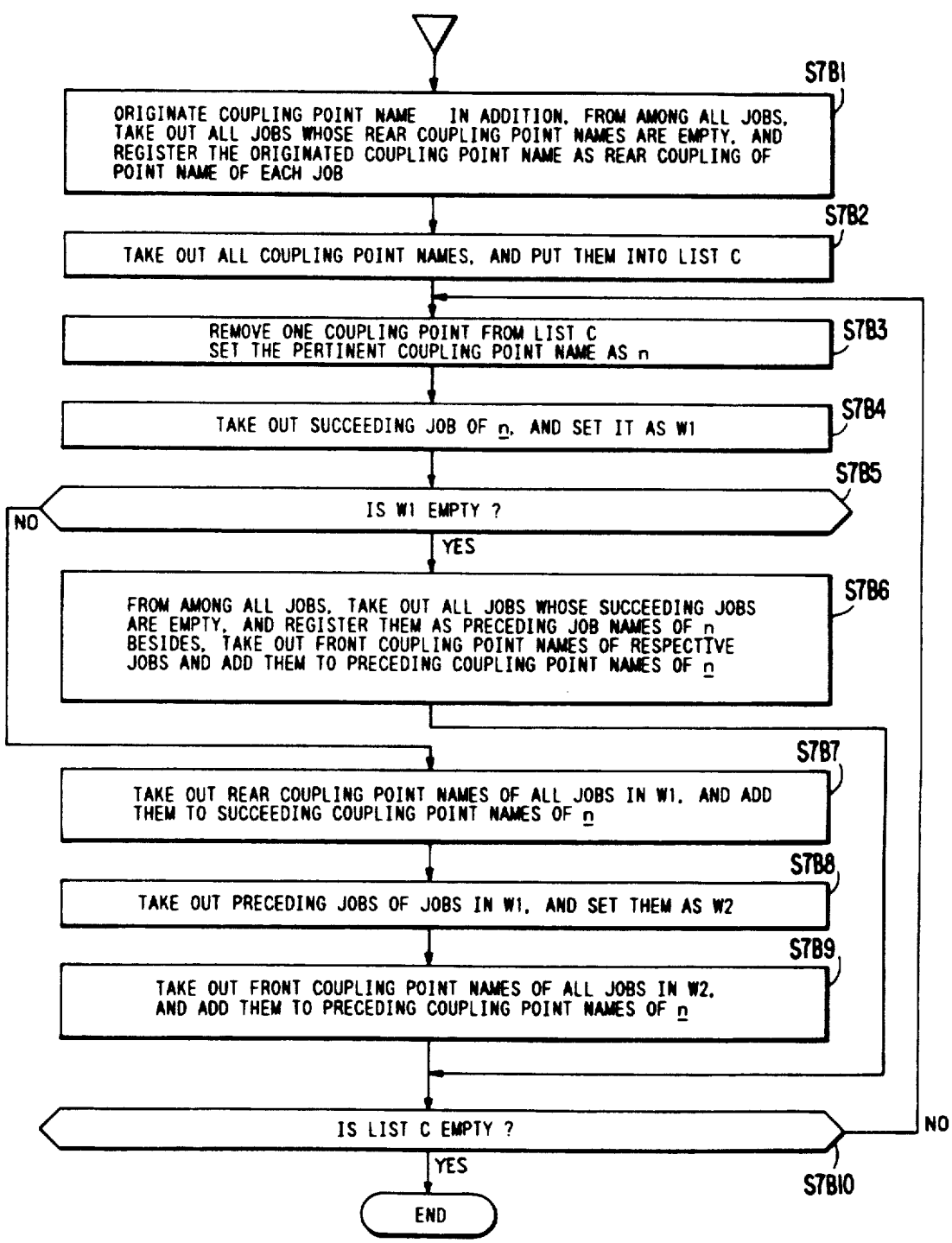

FIG. 8A

| JOB NAME | PRECED-ING JOB NAME | SUCCEED-ING JOB NAME | FRONT COUPLING POINT NAME | REAR COUPLING POINT NAME | WORKING PERIOD OF TIME |
|---|---|---|---|---|---|
| a | – | d, e | n1 | n2 | 4 |
| b | – | f, g | n1 | n3 | 5 |
| c | – | h, i | n1 | n4 | 2 |
| d | a | j, k | n2 | n5 | 5 |
| e | a | m | n2 | n7 | 5 |
| f | b | l | n3 | n6 | 6 |
| g | b | m | n3 | n7 | 5 |
| h | c | – | n4 | n8 | 9 |
| i | c | m | n4 | n7 | 6 |
| j | d | – | n5 | n8 | 3 |
| k | d | l | n5 | n6 | 8 |
| l | f, k | – | n6 | n8 | 5 |
| m | e, g, i | – | n7 | n8 | 2 |

FIG. 8B

| COUPLING POINT NAME | PRECEDING COUPLING POINT NAME | SUCCEEDING COUPLING POINT NAME | PRECED-ING JOB NAME | SUCCEED-ING JOB NAME |
|---|---|---|---|---|
| n1 | – | n2, n3, n4 | – | a b c |
| n2 | n1 | n5, n7 | a | d, e |
| n3 | n1 | n6, n7 | b | f, g |
| n4 | n1 | n7, n8 | c | h, i |
| n5 | n2 | n6, n8 | d | j, k |
| n6 | n3, n5 | n8 | f, k | l |
| n7 | n2, n3, n4 | n8 | e, g, i | m |
| n8 | n4, n5, n6, n7 | – | k, j, l, m | – |

FIG. 10A

| JOB NAME | EARLIEST START TIME | LATEST COMPLETION TIME |
|---|---|---|
| a | 0 | 4 |
| b | 0 | 11 |
| c | 0 | 13 |
| d | 4 | 9 |
| e | 4 | 20 |
| f | 5 | 17 |
| g | 5 | 20 |
| h | 2 | 22 |
| i | 2 | 20 |
| j | 9 | 22 |
| k | 9 | 17 |
| l | 17 | 22 |
| m | 10 | 22 |

FIG. 10B

| COUPLING POINT NAME | EARLIEST TIME | LATEST TIME |
|---|---|---|
| n1 | 0 | 0 |
| n2 | 4 | 4 |
| n3 | 5 | 11 |
| n4 | 2 | 13 |
| n5 | 9 | 9 |
| n6 | 17 | 17 |
| n7 | 10 | 20 |
| n8 | 22 | 22 |

FIG. 12

| ROUTE NO. | ROUTE | ROUTE LENGTH |
|---|---|---|
| 1 | n5,j,n8 | 1 3 |
| 2 | n1,b,n3,f,n6 | 1 7 |
| 3 | n2,e,n7,m,n8 | 1 8 |
| 4 | n1,c,n4,h,n8 | 2 2 |
| 5 | n1,b,n3,g,n7,m,n8 | 2 2 |
| 6 | n1,c,n4,i,n7,m,n8 | 2 2 |

FIG. 14A

| JOB NAME | Y-COORDINATE | JOB START TIME | JOB COMPLETION TIME |
|---|---|---|---|
| a | 0 | 0 | 4 |
| b | 2 | 0 | 5 |
| c | 4 | 0 | 2 |
| d | 0 | 4 | 9 |
| e | 3 | 4 | 9 |
| f | 2 | 5 | 1 1 |
| g | 5 | 5 | 1 0 |
| h | 4 | 2 | 1 1 |
| i | 6 | 2 | 8 |
| j | 1 | 9 | 1 2 |
| k | 0 | 9 | 1 7 |
| l | 0 | 1 7 | 2 2 |
| m | 3 | 1 0 | 1 2 |

FIG. 14B y-COORDINATE

| COUPLING POINT TIME | | COUPLING POINT TIME |
|---|---|---|
| n 1 | 0 | 0 |
| n 2 | 0 | 4 |
| n 3 | 2 | 5 |
| n 4 | 4 | 2 |
| n 5 | 0 | 9 |
| n 6 | 0 | 1 7 |
| n 7 | 3 | 1 0 |
| n 8 | 0 | 2 2 |

FIG. 17A

| JOB NAME | y-COORDI-NATE | JOB START TIME | JOB COMPLETION TIME |
|---|---|---|---|
| a | 0 | 0 | 4 |
| b | 2 | 1 | 6 |
| c | 4 | 2 | 4 |
| d | 0 | 4 | 9 |
| e | 3 | 5 | 10 |
| f | 2 | 8 | 14 |
| g | 5 | 10 | 15 |
| h | 4 | 11 | 20 |
| i | 6 | 7 | 13 |
| j | 1 | 13 | 16 |
| k | 0 | 9 | 17 |
| l | 0 | 17 | 22 |
| m | 3 | 18 | 20 |

FIG. 17B

| COUPLING POINT NAME | y-COORDINATE | COUPLING POINT TIME |
|---|---|---|
| n 1 | 0 | 0 |
| n 2 | 0 | 4 |
| n 3 | 2 | 7 |
| n 4 | 4 | 5 |
| n 5 | 0 | 9 |
| n 6 | 0 | 17 |
| n 7 | 3 | 16 |
| n 8 | 0 | 22 |

SYSTEM FOR GRAPHICALLY INDICATING THE ROUTING AND TIME RELATIONSHIPS BETWEEN JOBS FORMING A PROCESS

BACKGROUND OF THE INVENTION

The present invention relates to an operation process indicating method, and more particularly to an operation process indicating method for aiding an operator who conducts the operations of creating and revising an operation process.

Heretofore, there have been a Gantt chart and a network diagram as methods of indicating an operation process for use in systematically carrying forward an operation plan. The Gantt chart is a schedule table in which individual jobs and the job schedules thereof are briefly indicated in correspondence, and it is suited to correspondingly express the items of each individual job, such as start, continuation, interruption and end, and the absolute times thereof. On the other hand, the network diagram is a directed graph (arrow diagram) which is formed of arcs expressive of jobs and nodes expressive of the coupling points of the jobs, and it is suited to express the mutual relations among the jobs. In addition, since the mutual relations among the jobs can be expressed in a data format easily handled with a computer, it is also practised that the optimal operation process is created with the computer by applying such a technique as PERT (Performance Evaluation and Review Technique) or CPM (Critical Path Method) to a network (V. Kakura et al.: "Applications of Graph Theory with Computer" translated by Seiuemon Imoi et al., published by Kyoritsu Shuppan Kabushiki-Kaisha). Besides, as methods of expressing an operation process, there are mentioned a date planning apparatus disclosed in the official gazette of Japanese Patent Application Laid open No. 146898/1984, a project management chart disclosed in the official gazette of Japanese Patent Application Laid-open No. 86617/1985, and an operation planning chart disclosed in the official gazette of Japanese Patent Application Laid-open No. 84290/1986.

It is difficult, however, to understand the mutual relations among the jobs in the Gantt chart and the job schedules at the absolute times in the network diagram, and hence, in conducting the operations of creating and revising the operation process, an operator has needed to put forward the operations while comparing both the chart and the diagram with the eye. Moreover, in a case where the number of jobs increases to complicate the mutual relations of the jobs, these mutual relations among the jobs increasingly become difficult to understand in the Gantt chart, and lines intersect complicatedly in the network diagram, so that both the chart and the diagram have been difficult to see for the person who conducts the operations of creating and revising the operation process. This has led to the problem that the work efficiencies of the operations of creating and revising the operation process are inferior, so a long time and much labor are expended in obtaining the optimal operation process.

In addition, the date planning apparatus or the project management chart is intended to be used for the management of an operation process, and it has been unsuitable for the operations of creating and revising the operation process.

The operation planning chart is an invention which provides a method of aiding the creation of a network diagram, but it has had the problem that it is unsuited to express a complicated network diagram.

SUMMARY OF THE INVENTION

An object of the present invention is to solve the problems mentioned above, and to provide as one of aiding methods for the operations of creating and revising an operation process, a method of indicating an operation process chart which is easy to see and which is useful in conducting the above operations.

The problems are solved by an operation process indicating method for indicating an operation process formed of a plurality of jobs each of which has one or more preceding jobs including also a case where the job itself becomes a most preceding job, and each of which has its working period of time determined: comprising setting a start and an end of said operation process and points of contacts between the jobs as coupling points, and calculating an earliest time and a latest time at which the job immediately succeeding each of said coupling points can be done earliest and latest since the start of said operation process, respectively; fetching all the coupling points the earliest times and the latest times of which are equal, and creating a critical path in which these coupling points are arrayed in an order of earliness in time and with job names of the corresponding jobs held between the respectively adjacent coupling points; calculating all job routes each of which starts from one coupling point lying on said critical path and returns again to another coupling point lying on said critical path after one or more of the jobs not lying on said critical path has/have been done; calculating as to each of said all job routes, a job route length which is a difference between the earliest time of said other coupling point and that of said one coupling point; and setting one axis as a time axis and another axis orthogonal thereto as an axis of ordinates, expressing a certain one of the jobs in the form of a segment which is parallel to said time axis and in which two points of an earliest start time and a latest completion time of the job are respectively denoted by time coordinates as end points, arranging said critical path and said respective job routes at coordinates of said axis of ordinates at predetermined intervals in consideration of the job route lengths in such a manner that said segment does not overlap a segment expressing another of the jobs, and connecting the end point denotative of the earliest start time on said segment expressive of the job and the end point denotative of the latest completion time on the segment expressive of the job immediately preceding the former job, through the coupling point of said former job and its preceding job, and thus indicating them.

The earliest times and latest times of coupling points for connecting jobs are calculated from the respective jobs, the working periods of time thereof and the sequential relations thereof; all the coupling points the earliest times and latest times of which are equal are fetched, and a critical path is created in which these coupling points are arrayed in the sequence of earliness in time and with the names of the corresponding jobs held between the respectively adjacent coupling points; all job routes are calculated each of which starts from one coupling point lying on the critical path and returns again to another coupling point lying on this critical path after at least one of the jobs not lying on this critical path has been done; the job route lengths of all the job routes are calculated; and each of the jobs included in the critical path and all the job routes is expressed by a segment which is parallel to a time axis and whose end points are the two points of the earliest start time and latest completion time of the particular job, the critical path and all the job routes are arranged at the coordinates of an axis of ordinates orthogonal to the time axis at predetermined intervals in accordance with the route lengths in such a manner that the segment does not overlap a segment expressing another of the jobs, and the end point denotative of the earliest start time on the segment expressive of a certain one of the jobs and the end point denotative of the latest completion time on the segment expressive of the job immediately preceding the certain job are connected through the coupling point of the certain job and its preceding job and are thus indicated.

BRIEF DESCRIPTION OF THE DRAWINGS

FIG. 5 is a diagram listing up attribute names which are defined for jobs in an embodiment of the present invention.

FIG. 6 is a diagram listing up attribute names which are defined for coupling points in an embodiment of the present invention.

FIGS. 7A and 7B are processing flow charts of preprocessing in an embodiment of the operation process indicating method of the present invention.

FIG. 8A is a diagram listing up job data originated by the preprocessing.

FIG. 8B is a diagram listing up coupling point data originated by the preprocessing.

FIG. 10A is a diagram listing up job data originated by the critical path processing.

FIG. 10B is a diagram listing up coupling point data originated by the critical path processing.

FIG. 12 is a diagram listing up data on routes originated by the job arrangement sequence determination processing.

FIG. 14A is a diagram listing up job data originated by the coordinate setting processing.

FIG. 14B is a diagram listing up coupling point data originated by the coordinate setting processing.

FIG. 17A is a diagram listing up job data for the operation process chart of FIG. 4.

FIG. 17B is a diagram listing up coupling point data for the operation process chart of FIG. 4.

DESCRIPTION OF THE PREFERRED EMBODIMENTS

Figure 1:
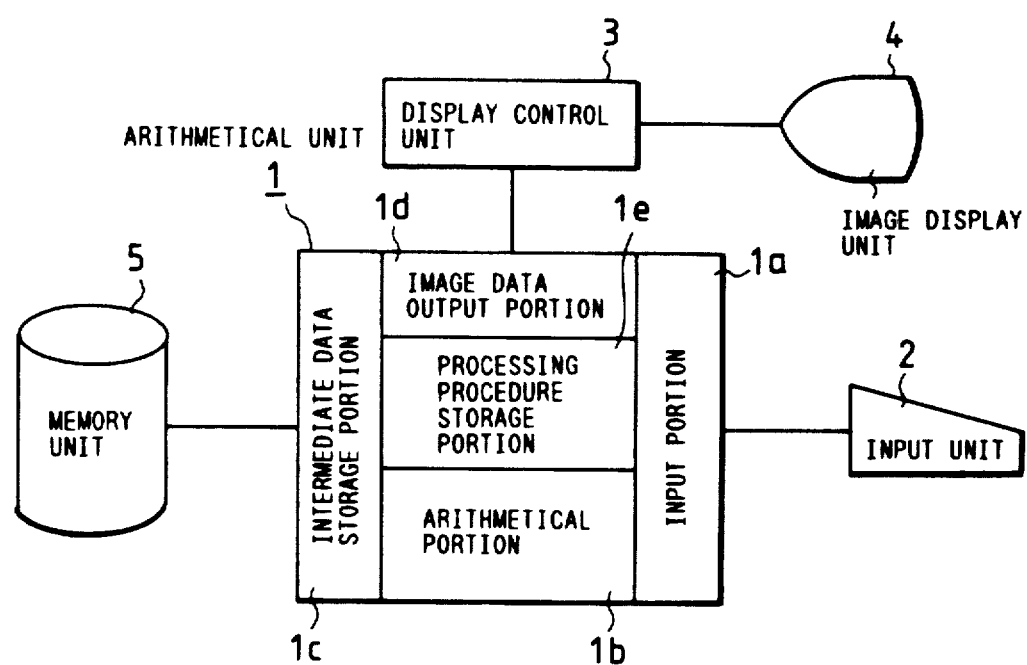
FIG. 1 is an explanatory diagram of a computer architecture for performing the operation process indicating method of the present invention.

FIG. 1 shows an embodiment of a computer architecture for performing an operation process indicating method according to the present invention. A memory unit 5 stores therein the operation process data of the mutual relations between jobs, the periods of time required till the completions of the respective jobs, etc. The interior of an arithmetical unit 1 is divided into an input portion 1a, an arithmetical portion 1b, an intermediate data storage portion 1c, an image data output portion 1d and a processing procedure storage portion 1e. The processing procedure storage portion 1e stores therein processing procedures for creating an operation process chart based on the operation process indicating method of the present invention from the operation process data stored in the memory unit 5 and for displaying the created chart. The arithmetical portion 1b successively calls out and executes the processing procedures stored in the processing procedure storage portion 1e. A display control unit 3 indicates on an image display unit 4 the operation process chart which is based on pattern data originated in accordance with the processing procedures. A user views the displayed operation process chart, and applies data necessary for the edition and revision of an operation process from an input unit 2.

Figure 2:
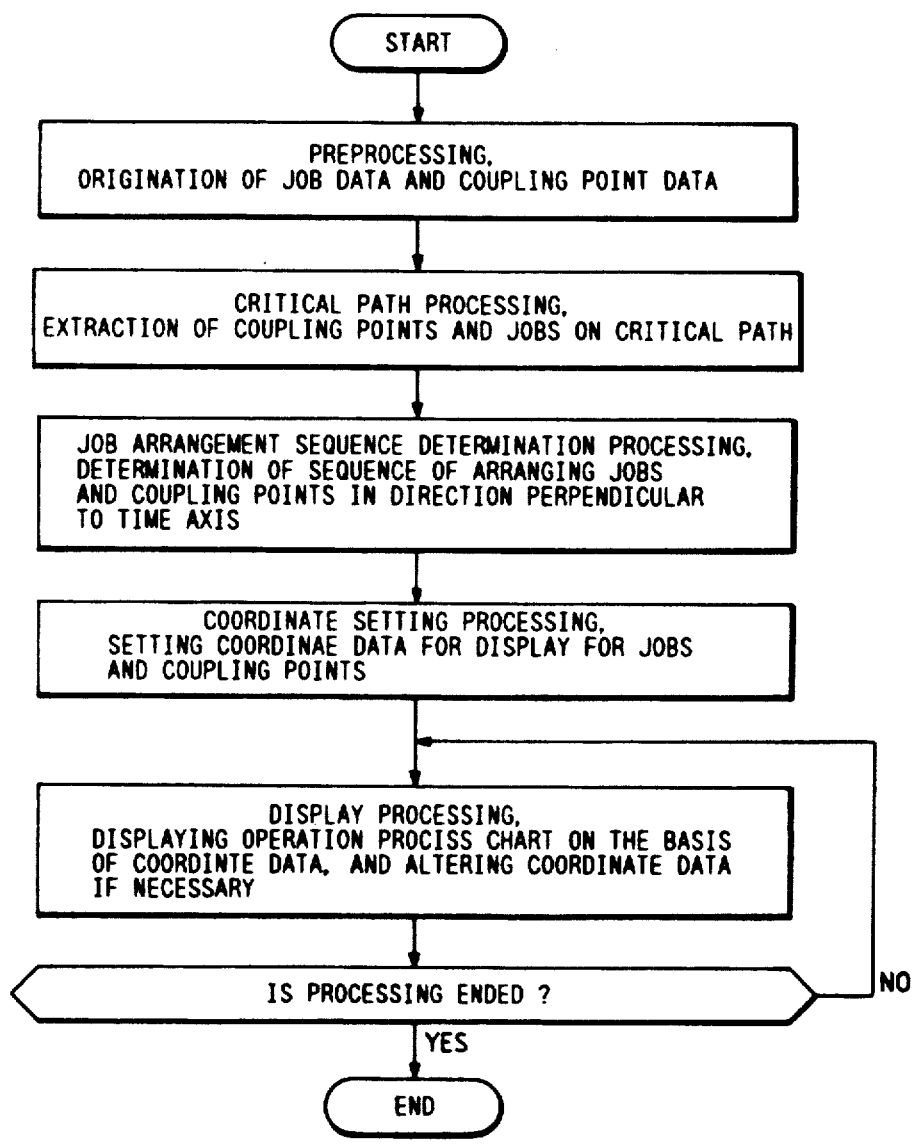
FIG. 2 is a general processing flow chart of an embodiment of the operation process indicating method of the present invention.
Figures 3, 4:
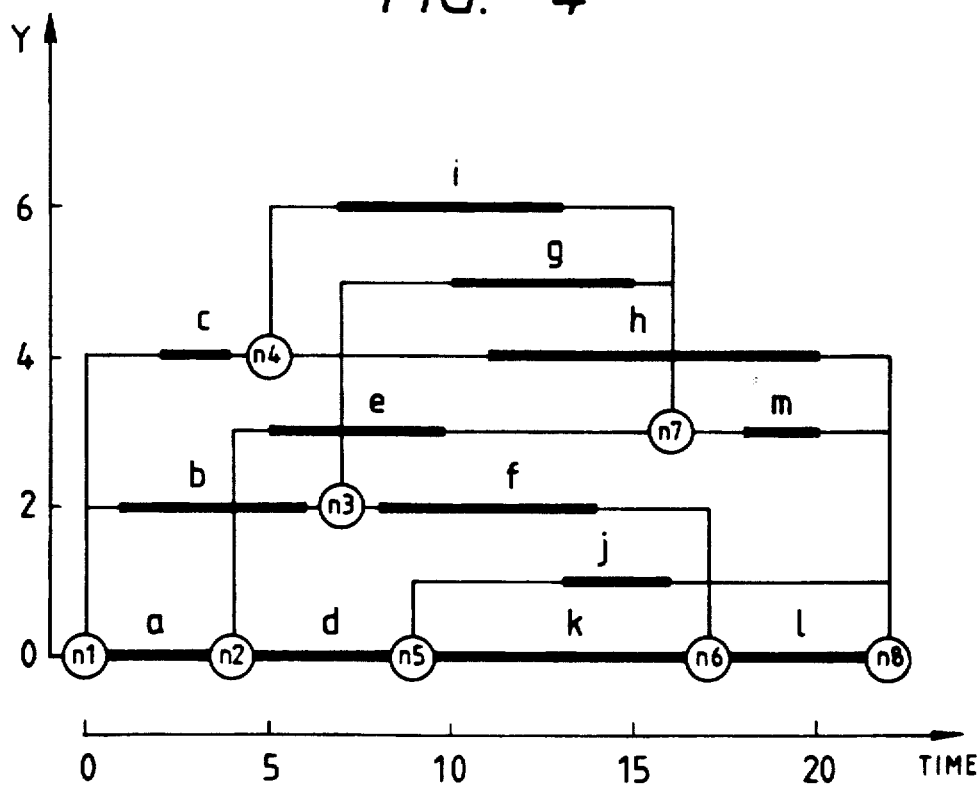
FIG. 3 is a diagram showing the data of an operation process to which the embodiment is directed.
FIG. 4 is an operation process chart based on the operation process indicating method of the present invention.

Shown in FIG. 2 is a general processing flow chart of an embodiment of the processing contents of the operation process indicating method of the present invention. This flow is stored in the processing procedure storage portion 1e shown in FIG. 1. Listed in FIG. 3 are operation process data items to which this embodiment is directed. The operation process data items are previously stored in the memory unit 5 shown in FIG. 1 before the processing of this embodiment is started. As to thirteen jobs a to m, FIG. 3 shows the correspondence between the periods of time of the respective jobs (the periods of time required till the completions of the jobs) and the jobs preceding the respective jobs. For example, 2 days are expended in completing the job m, and it is indispensable to the start of the job m that all the jobs e, g and i are completed. FIG. 4 shows an operation process chart which is indicated on the image display unit 4 in the operation process indicating apparatus in FIG. 1, on the basis of the operation process data in FIG. 3 and according to the operation process indicating method in FIG. 2. In this embodiment, all the jobs are expressed by segments which are parallel to a time axis and in each of which two points having the earliest start time of the pertinent job (the earliest value of a job start time) and the latest completion time thereof (the latest value of a job completion time) as their respective time coordinates form end points. In addition, on the segment, a part corresponding to an actual period of time (in a time interval during which the job can be done, a time interval during which the job is actually done) and a part corresponding to a surplus period of time (in the time interval during which the job can be done, a time interval during which the job is not actually done) are distinctively indicated by bold and fine lines, respectively. Here, the actual working period of time and the surplus period of time are distinguished using the thicknesses of the lines. Alternatively, they can be distinguished using, e.g., the sorts of lines, the tones of lines or the colors of lines, or the brightnesses of lines or a blink in case of indicating them on a CRT. In this embodiment, the segments which correspond to the jobs lying on a critical path are connected and indicated on an identical straight line. The critical path is the array of the jobs which have no surplus period of time and which are continuous, and the length of the critical path corresponds directly to the period of time which is expended till the completion of all the jobs. In this embodiment, the critical path is configured of the jobs a, d, k and l. The segments which correspond to the jobs not lying on the critical path are successively arranged in a direction perpendicular to the critical path in accordance with a predetermined method of arrangement. The details of the arrangement method will be described later. Besides, as to all the jobs, marks of circles are arranged on segments each of which connects the earliest start time point on the segment expressive of the pertinent job and the latest completion time point on the segment expressive of the jot, preceding the pertinent job, whereby the coupling points between the jobs are expressed. In this embodiment, the connecting segment is a segment perpendicular to the time axis and has no time width. According to this embodiment, especially the critical path is indicated on the identical straight line, so that influences which the process adjustments of the jobs corresponding to the segments on the straight line exert on the period of time till the completion of all the jobs can be predicted visually, intuitively and quantitatively. Moreover, the jobs lying on the critical path and the other jobs can be definitely distinguished, so that in adjusting the operation process, the job to be first adjusted is readily found. The reason why the critical path is arranged on the identical straight line here, is to facilitate grasping the jobs of the critical path as a group. If the jobs are held near in the arrangement, the critical path need not always lie on the identical line strictly.

In addition, the sorts of attributes defined for the jobs for use in this embodiment are shown in FIG. 5, while the sorts of attributes defined for the coupling points between the respectively adjacent jobs are shown in FIG. 6.

Now, there will be described the details of the processing procedure in an embodiment of the operation process indicating method illustrated by the processing flow chart of FIG. 2. As shown in FIG. 2, the processing procedure of this operation process indicating method is divided into the sub processing steps of preprocessing, critical path processing, job arrangement sequence determination processing, coordinate setting processing and display processing, depending upon the contents thereof.

Figure 7A:
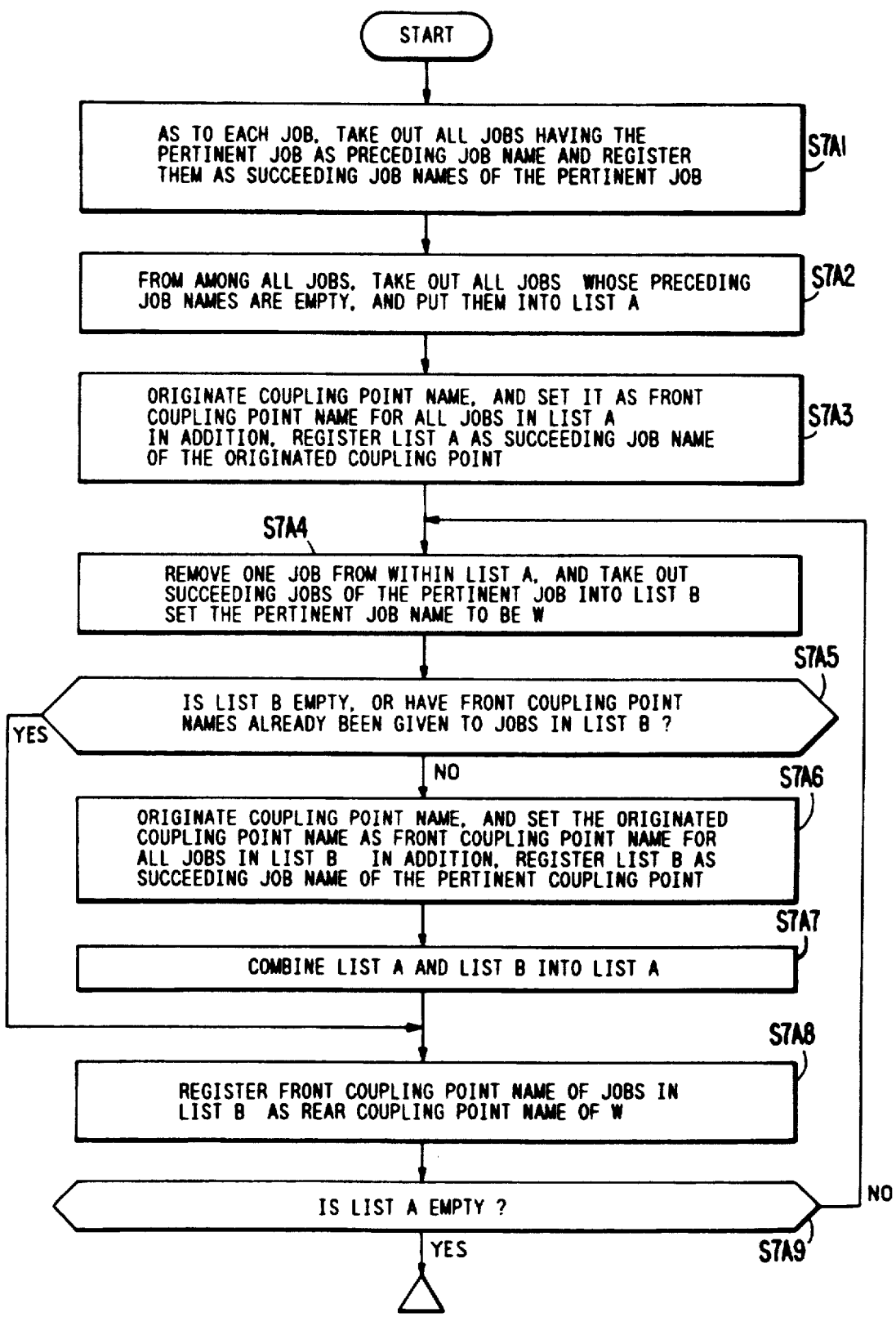

In the preprocessing, the couplings between the jobs are traced on the basis of the operation process data items which are stored in the memory unit 5 in FIG. 1 in accordance with the data form in FIG. 3, so as to find the job data items of all the jobs, such as succeeding job names, front coupling point names and rear coupling point names, and the coupling point data items of all the coupling points, such as preceding coupling point names, succeeding coupling point names, preceding job names and succeeding job names, and the found data items are stored in the memory unit 5 in FIG. 1. The flow charts of this processing are shown in FIGS. 7A and 7B.

First, the operation process data items which are stored in the memory unit 5 in FIG. 1 in conformity with the data form in FIG. 3 are read out and are stored in the intermediate data storage portion 1c (Step S7A1). Subsequently, from among the data items, all the jobs having no preceding job name are extracted, and they are stored in the intermediate data storage portion 1c in the form of a list (Step S7A2). In this embodiment, the list becomes (a, b, c). Subsequently, n1 is originated and registered as the preceding coupling point name of all the jobs in the list. In addition, (a, b, c) is registered as the succeeding job name for n1 (Step SA73). Thenceforth, the operation process data items which are composed of the job data items of all the jobs, such as succeeding job names, front coupling point names and rear coupling point names, and the coupling point data items of all the coupling points, such as preceding coupling point names, succeeding coupling point names, preceding job names and succeeding job names, are originated according to the processing steps S7A4 through S7A9 shown in FIG. 7A and the processing steps S7B1 through S7B10 in FIG. 7B, and the originated data items are stored in the memory unit 5 in FIG. 1. The job data items originated by the preprocessing in this embodiment are shown in FIG. 8A, and the coupling point data items in FIG. 8B.

In the critical path processing, the earliest times and latest times of all the coupling points are first obtained on the basis of the coupling point data originated by the preprocessing, and the list of the coupling point names lying on the critical path is subsequently created by referring to the obtained times. Further, the list of the job names lying on the critical path is created on the basis of the list of the coupling point names lying on the critical path and the operation process data originated by the preprocessing and stored in the memory unit 5 in FIG. 1. Besides, the earliest job start times and latest job completion times of all the jobs are determined. The operation process data items originated by this processing are stored in the memory unit 5 in FIG. 1. The contents of the critical path processing are further divided into the three stages of an advance stage, a retreat stage and a comparison stage.

Figure 9A:
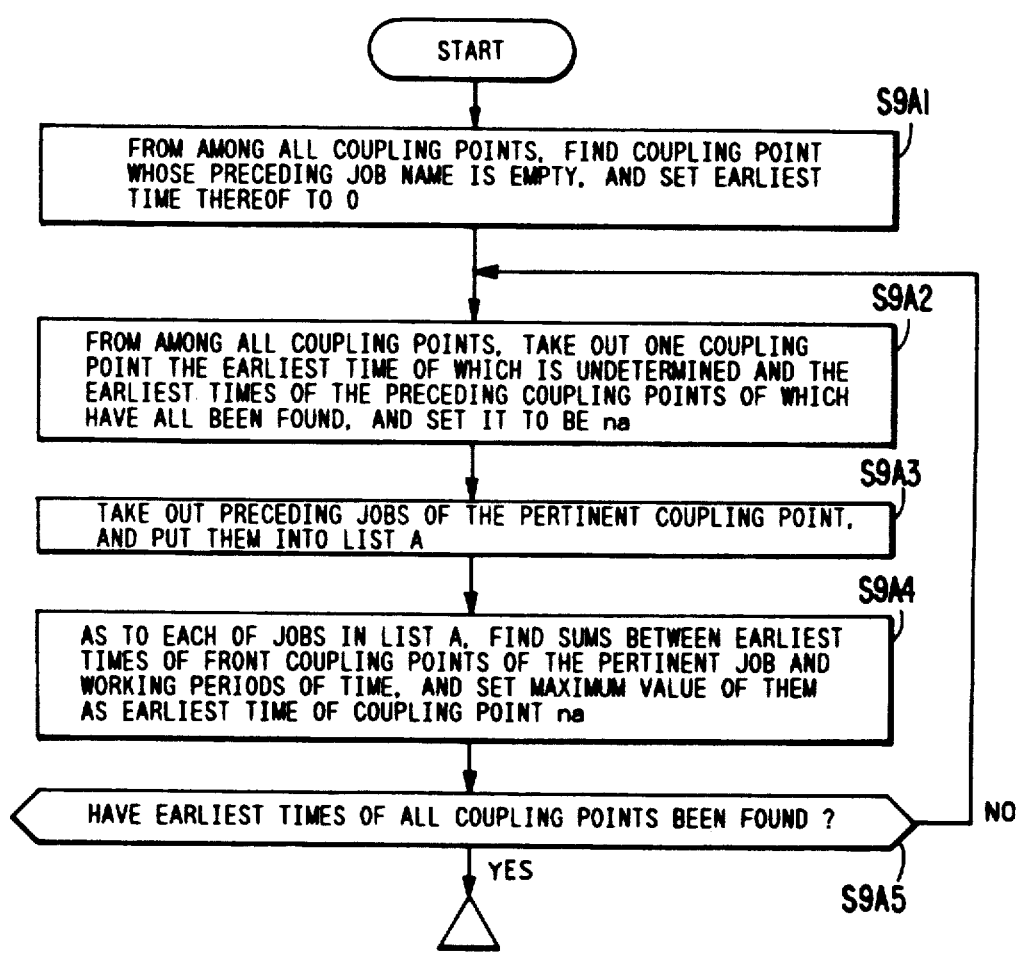
FIG. 9A is a processing flow chart of the advance stage of critical path processing in an embodiment of the operation process indicating method of the present invention.

FIG. 9A shows a processing flow chart of the advance stage. At the advance stage, first of all, the operation process data items which are composed of the job data and the coupling point data and which have been originated by the preprocessing and stored in the memory unit 5 in FIG. 1 are read out and are stored in the intermediate data storage portion 1c. Subsequently, the head coupling point name is extracted from among the coupling point data items (Step S9A1). In this embodiment, the coupling point name is n1. The earliest time of n1 is set at 0. Next, from among all the coupling points, one coupling point the earliest time of which is undetermined and the earliest times of the preceding coupling points of which have been all found (for example, n2 in this embodiment) is taken out (Step S9A2), and, the earliest time of this coupling point is determined (Steps S9A3 and S9A4). Thenceforth, the earliest times of all the coupling points are obtained according to the processing steps S9A2 through S9A5 shown in FIG. 9A and are stored in the memory unit 5 in FIG. 1.

Figure 9B:
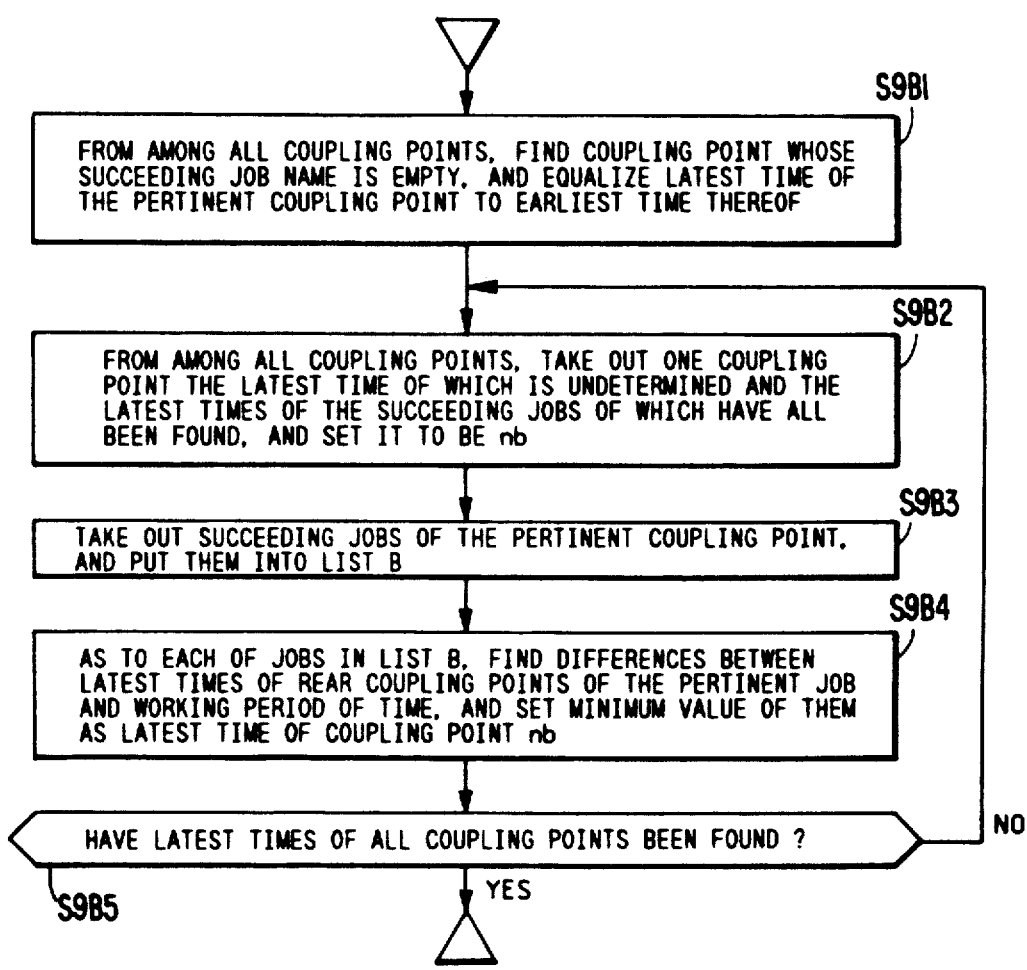
FIG. 9B is a processing flow chart of the retreat stage of the critical path processing.

FIG. 9B shows a processing flow chart of the retreat stage begins with Steps S9B1. The retreat stage executes processing equivalent to the converse to the case of the advance stage from the coupling point having no succeeding job, whereby the latest times of all the coupling points are found and are stored in the memory unit 5 in FIG. 1. In this embodiment, the coupling point having no succeeding job is n8, and the latest time of n8 is set at 22 being the earliest time thereof. Thenceforth, the latest times of all the coupling points are obtained according to the processing steps S9B2 through S9B5 shown in FIG. 9B and are stored in the memory unit 5 in FIG. 1.

The coupling point data items which have been originated at the above two stages and stored in the memory unit 5 in FIG. 1 in this embodiment, are shown in FIG. 10B.

Figure 9C:
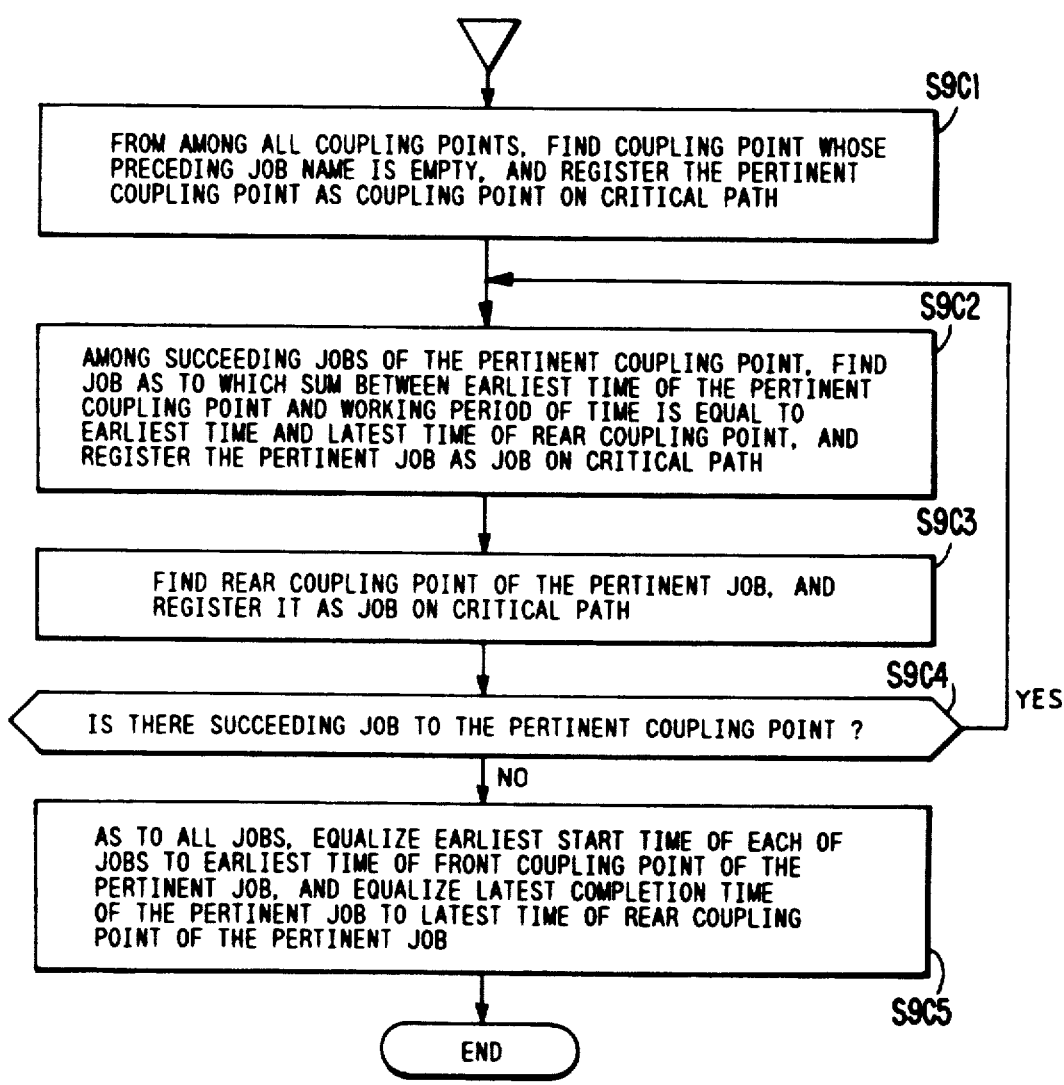
FIG. 9C is a processing flow chart of the comparison stage of the critical path processing.

FIG. 9C shows a processing flow chart including steps S9C1 through S9C5 of the comparison stage. At the comparison stage, regarding the coupling point data items shown in FIG. 10B as have been originated at the advance and retreat stages and stored in the memory unit 5 in FIG. 1, the earliest times and latest times of all the coupling points are compared, and the coupling points the earliest times and latest times of which are equal are put into the form of a list, which is stored in the intermediate data storage portion 1c in FIG. 1. These coupling points have no surplus period of time, that is, they lie on the critical path. In this embodiment, the list is (n1, n2, n5, n6, n8). Further, by referring to the operation process data stored in the memory unit 5 in FIG. 1 and the list of the coupling points lying on the critical path, those of all the jobs whose front coupling points and rear coupling points lie on the critical path and which have no surplus period of time are put into the form of a list, which is stored in the intermediate data storage portion 1c in FIG. 1. In this embodiment, the list is (a, d, k, l), and the jobs included therein lie on the critical path. Besides, at this stage, the earliest start times and latest completion times of all the jobs are obtained and are stored in the memory unit 5 in FIG. 1. The earliest start times and latest completion times of the jobs in this embodiment are shown in FIG. 10A.

Figure 11A:
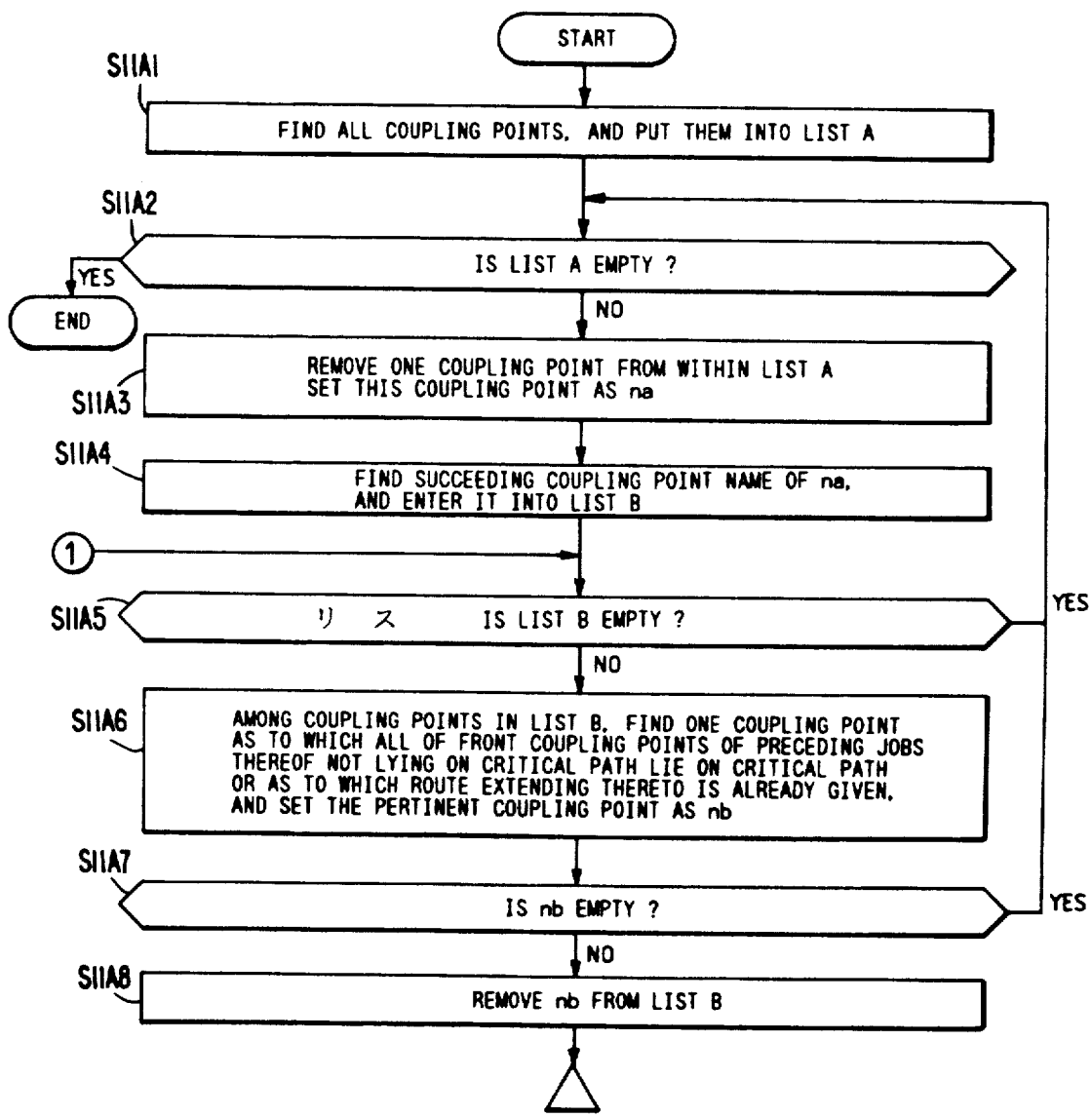
FIGS. 11A, 11B and 11C are processing flow charts of job arrangement sequence determination processing in an embodiment of the operation process indicating method of the present invention.
Figure 11B:
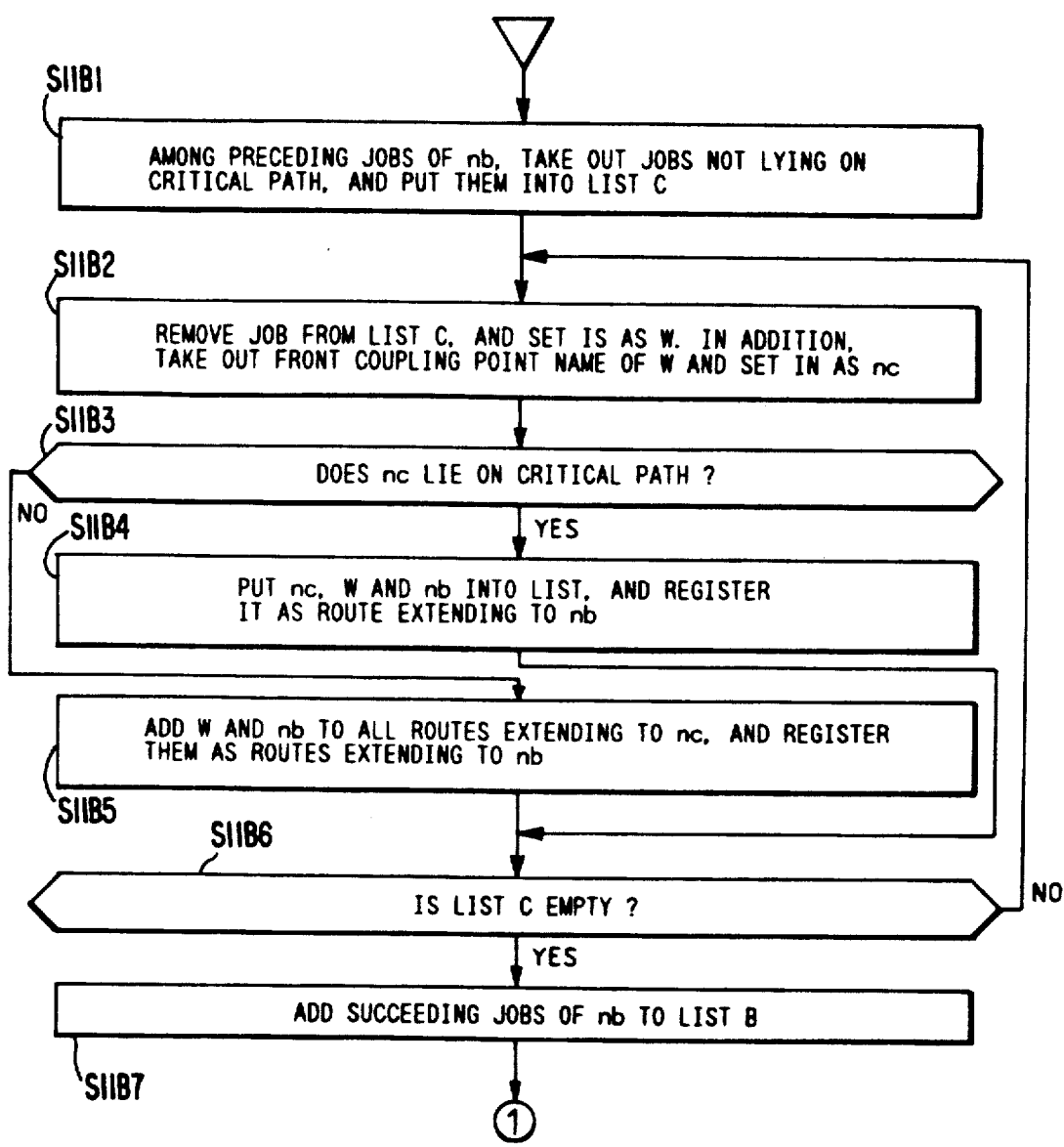
Figure 11C:
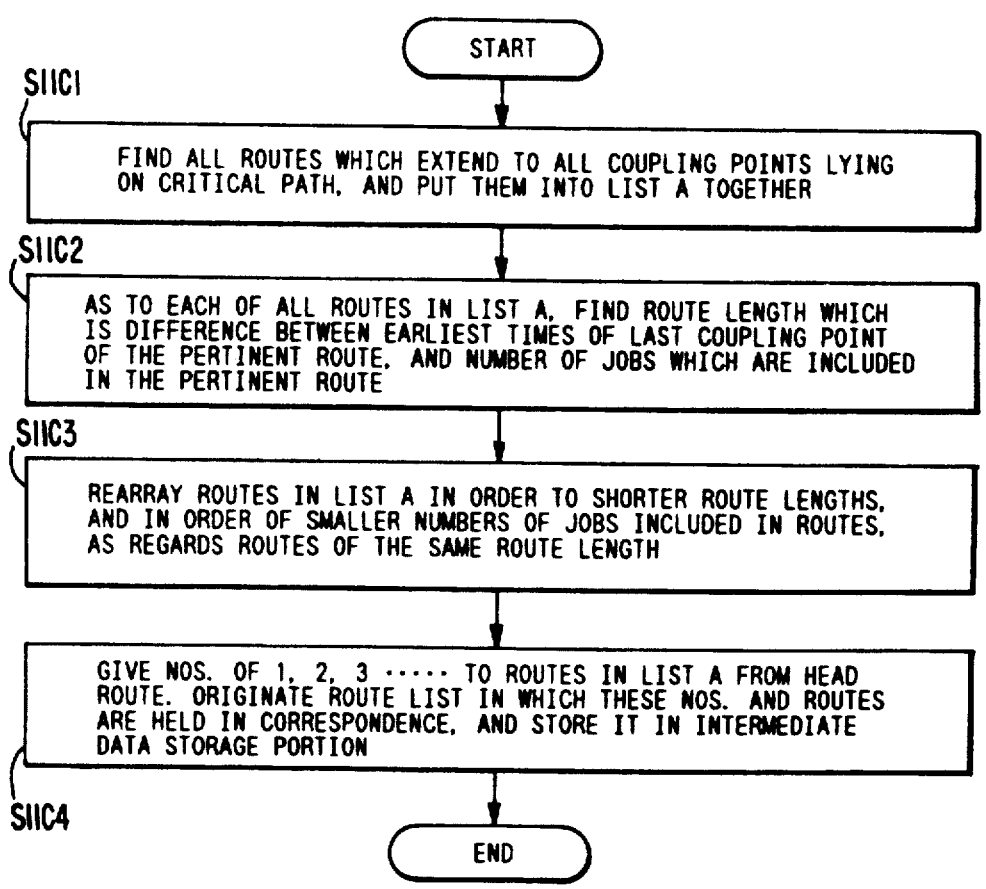

Next, the job arrangement sequence determination processing will be described. The processing flow charts of the job arrangement sequence determination processing are shown in FIGS. 11A, 11B and 11C. The job arrangement sequence determination processing determines the sequence of arranging the segments expressive of the jobs in the direction perpendicular to the time axis, in the case of displaying the operation process chart on the basis of the operation process data stored in the memory unit 5 in FIG. 1 and the lists of the jobs and the coupling points on the critical path as originated by the critical path processing and stored in the intermediate data storage portion 1c in FIG. 1.

First, the connections between the jobs and the coupling points are traced on the basis of the operation process data and in accordance with the processing steps S11A1 through S11A8 shown in FIG. 11A and the processing steps S11B1 through S11B7 in FIG. 11B, so as to find out all routes each of which has as its start point any coupling point lying on the critical path and returns to another coupling point lying on the critical path again via at least one job not lying on the critical path, and the job names and the coupling point names lying on the respective routes are put into the form of lists, which are stored in the intermediate data storage portion 1c in FIG. 1. The routes obtained here are six routes; (n1, b, n3, f, n6), (n1, b, n3, g, n7, m, m8), (n1, c, n4, i, n7, m, n8), (n1, c, n4, h, n8), (n2, e, n7, m, n8) and (n5, j, n8).

Subsequently, according to the processing steps S11C1 through S11C4 in FIG. 11C and as regards each of the above routes, the route length which is the difference between the earliest times (or the latest times) of the coupling points on the critical path as located at both the ends of the list of the pertinent route is evaluated, and it is stored in the intermediate data storage portion 1c in FIG. 1 in correspondence with the pertinent route. Here, the route lengths of the aforementioned routes become 17, 22, 22, 22, 18 and 13, respectively. The routes are subsequently rearrayed in the order of shorter route lengths, and in the order of smaller number of jobs included in the lists of the routes, as to the routes of the same route length. The routes are successively numbered 1, 2, 3, . . . from the head route, and these numbers, the lists of the routes and the route lengths held in correspondence by a data form in FIG. 12 are stored in the intermediate data storage portion 1c in FIG. 1 again.

Figure 13:
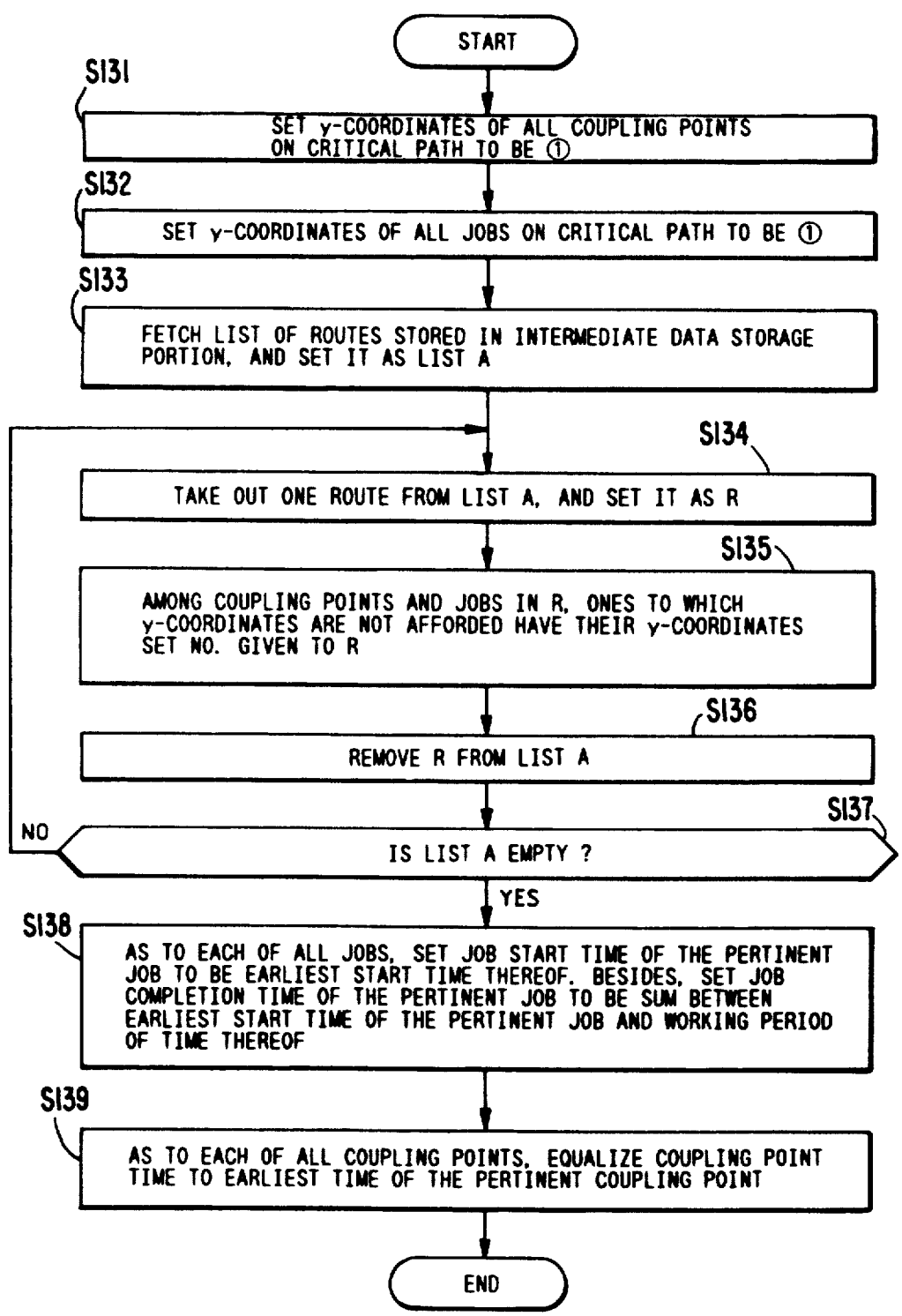
FIG. 13 is a processing flow chart of coordinate setting processing in an embodiment of the operation process indicating method of the present invention.

FIG. 13 shows a processing flow chart of the coordinate setting processing, including Steps S131 through S139. In the coordinate setting processing, the job start times, job completion times and y-coordinate values of all the jobs and the coupling point times and y-coordinate values of all the coupling points are determined in accordance with the processing flow chart and on the basis of the operation process data stored in the memory unit 5 in FIG. 1 and the data on the routes in FIG. 12 as stored in the intermediate data storage portion 1c in FIG. 1. The job start time and the job completion time correspond respectively to the time coordinates of the two points at both the ends of the segment which denotes the actual working period of time (in the time interval during which the job can be done, the time interval during which the job is actually done) in the operation process chart of this embodiment. In addition, the coupling point time corresponds to the time coordinate of the mark of the circle which expresses the coupling point in the operation process chart of this embodiment. In this embodiment, the y-axis is set as an axis which is perpendicular to the time base on a display screen.

First, the y-coordinates of the jobs and the coupling points lying on the critical path are all set to 0. On the other hand, the y-coordinates of the jobs and the coupling points not lying on the critical path are set to the Nos. given to the routes shown in FIG. 12 and created by the job arrangement sequence determination processing part, the list of each of the routes including the pertinent job or coupling point therein. In a case where a plurality of y-coordinate values are prospective for one job or one coupling point, the smallest coordinate value is set as the corresponding y-coordinate. Subsequently, as to each of all the jobs, the job start time of the job is equalized to the earliest start time, and the job completion time of the job is equalized to the sum between the job start time of the job and the working period of time thereof. Besides, the coupling point time of each of all the coupling points is equalized to the earliest time of the coupling point. The job data items originated by the coordinate setting processing in this embodiment are shown in FIG. 14A, while the coupling point data items are shown in FIG. 14B. These operation process data items are also stored in the memory unit 5 in FIG. 1.

Figure 15A:
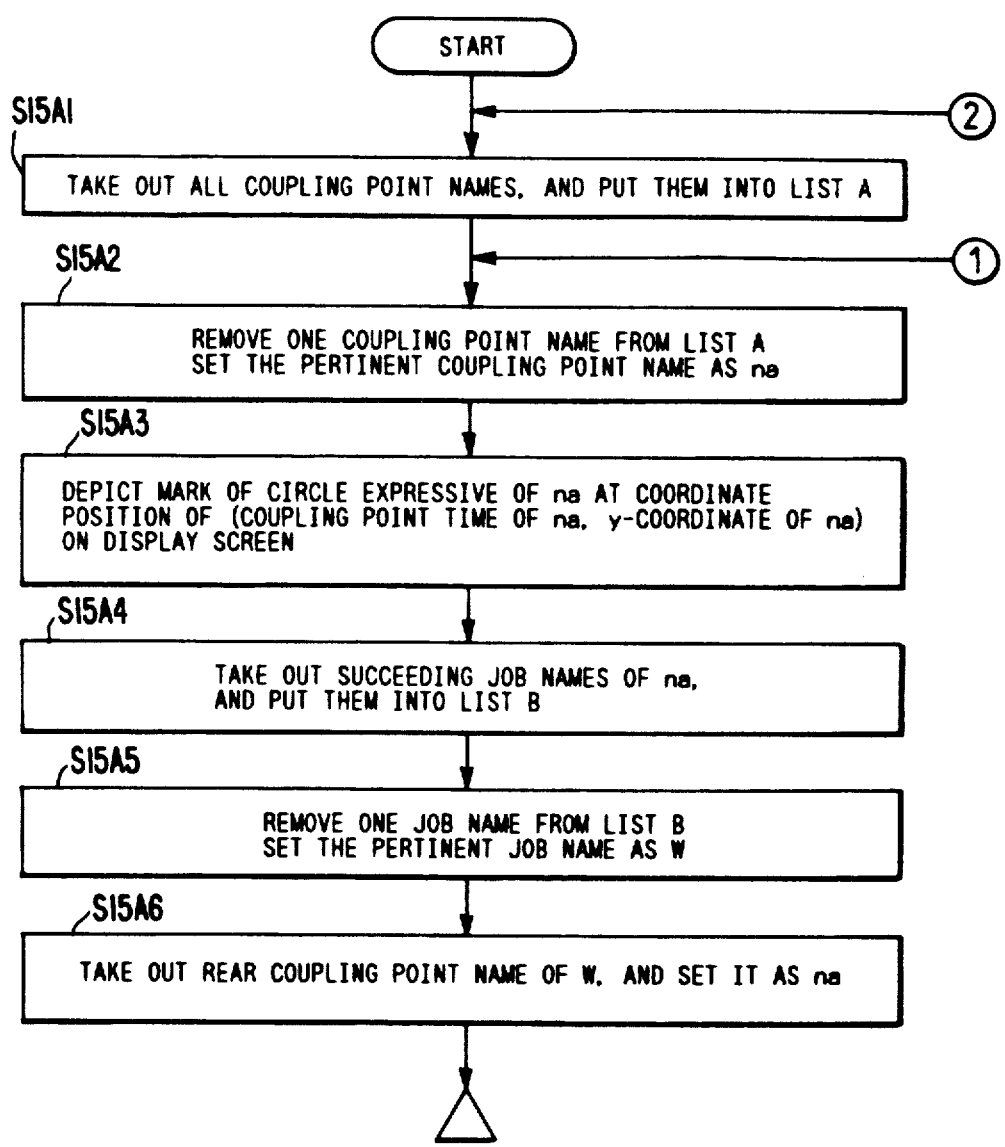
FIGS. 15A and 15B are processing flow charts of display processing in an embodiment of the operation process indicating method of the present invention.
Figure 15B:
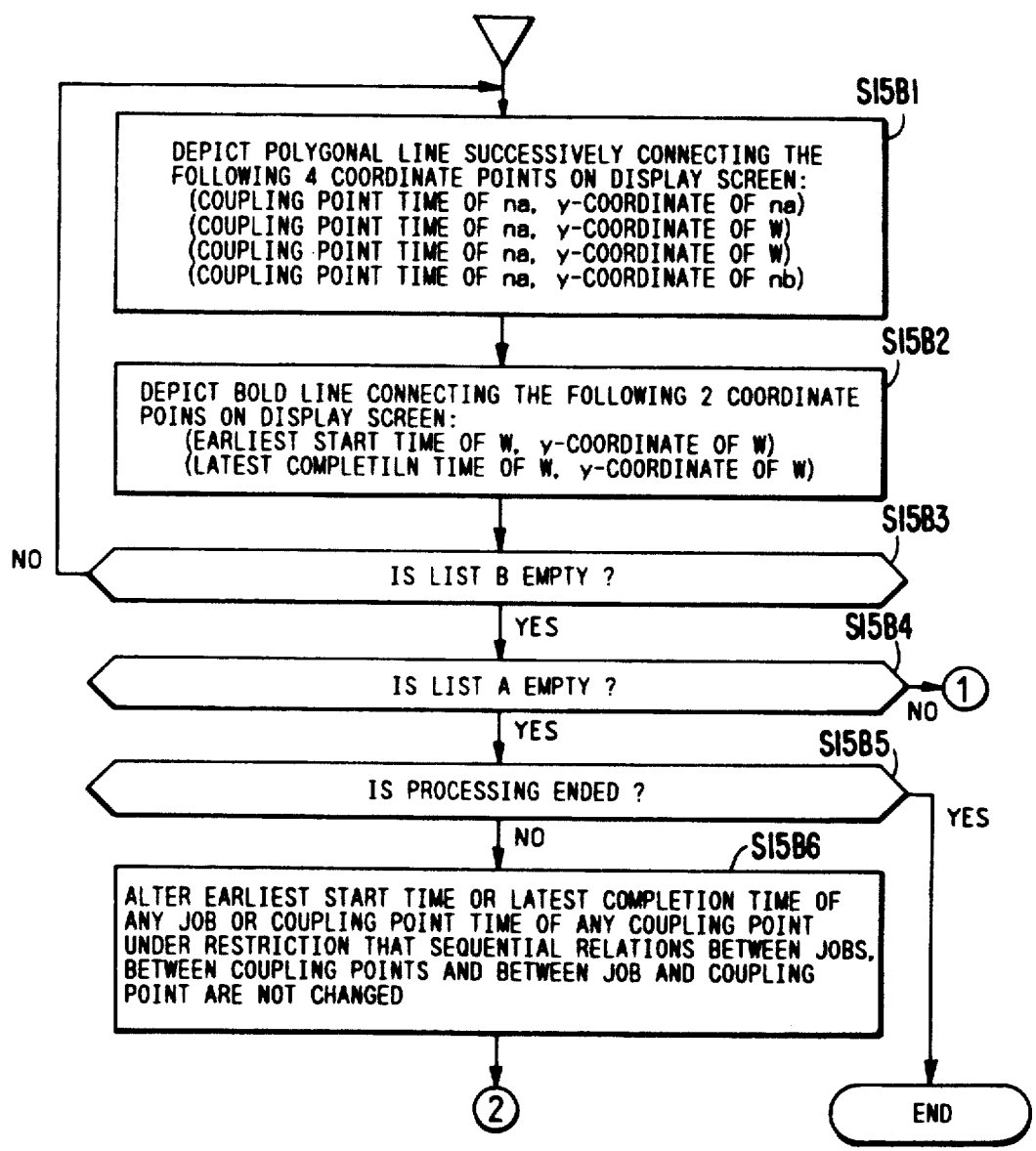

FIGS. 15A and 15B show processing flow charts of the display processing, including processing steps S15A1 through S15A6 in FIG. 15A and processing steps S15B1 through S15B6 in FIG. 15B. In the display processing, pattern data items are originated in accordance with the processing flow charts and on the basis of the operation process data stored in the memory unit 5 in FIG. 1, and the operation process chart which is configured of the segments and characters is indicated on the display screen.

Figure 16:
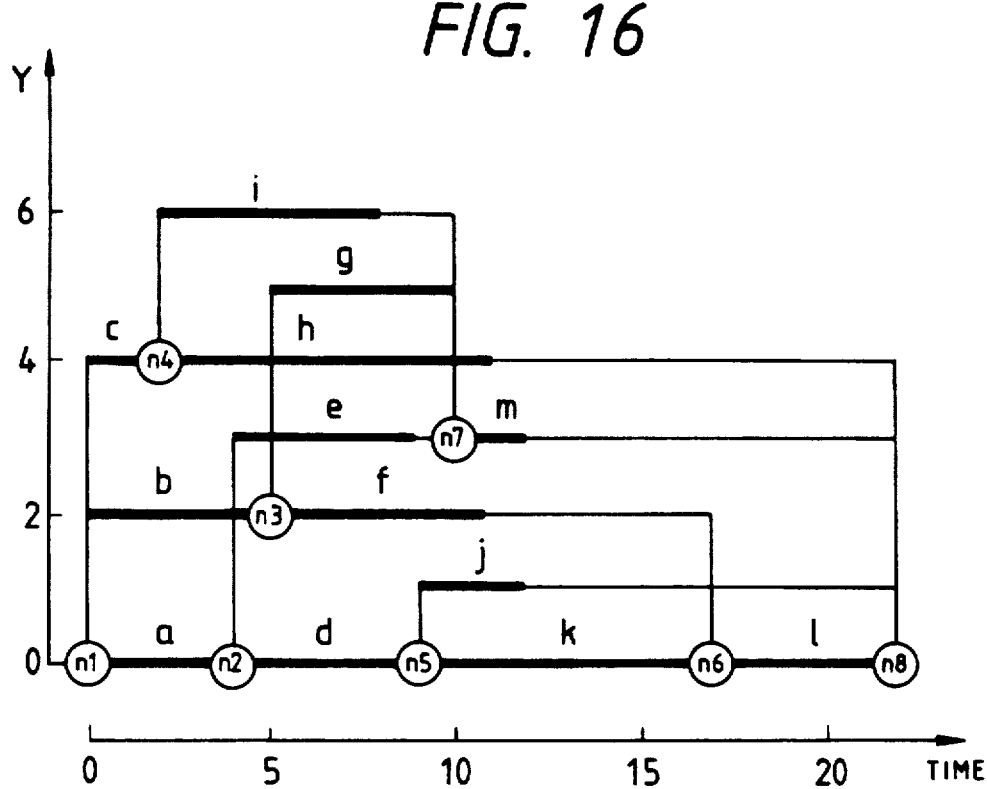
FIG. 16 is an operation process chart based on the present invention as indicated by the display processing.

Shown in FIG. 16 is the initial chart of the operation process chart which is indicated on the display screen as the result of the display processing in this embodiment. FIG. 16 is the operation process chart for the earliest outset process which begins the jobs as soon as the start conditions of the jobs have been met. In this regard, the job start times, job completion times and coupling point times stored in the memory unit 5 in FIG. 1 are altered under the restriction that the sequential relations between the jobs, between the coupling points and between the job and the coupling point are not changed, and the display processing is carried out again, whereby the operation process chart shown in FIG. 4 can be obtained. The job data items corresponding to the operation process chart of FIG. 4 are shown in FIG. 17A, while the coupling point data items are shown in FIG. 17B.

Figure 18:
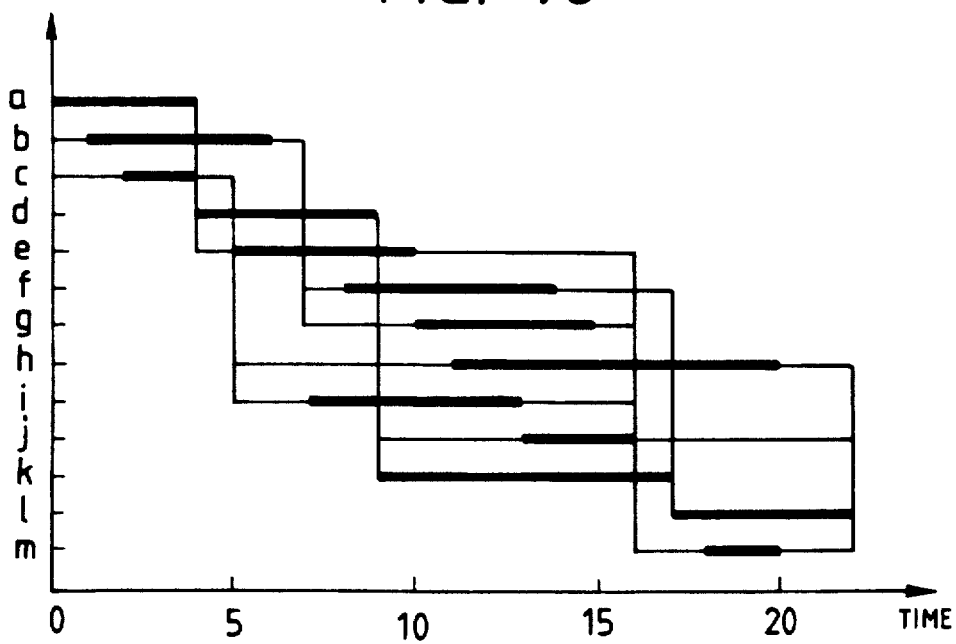
FIG. 18 is an operation process chart separate from FIG. 4 as based on the operation process indicating method of the present invention.

Besides, FIG. 18 shows another example of an operation process chart based on the operation process indicating method according to the present invention. In this embodiment, as in FIG. 1, each of all jobs is expressed by a segment which is parallel to a time axis and whose end points are two points having the earliest start time and latest completion time of the pertinent job as their respective time coordinates, and the earliest start time point on the segment and the latest completion time point on a segment expressive of the job preceding the pertinent job are connected by a segment. Further, on the segment corresponding to each of all the jobs, the actual working period of time of the pertinent job is expressed by a bold line, and it is indicated in distinction from the surplus period of time of the pertinent job. This embodiment, however, has the feature different from FIG. 4 that the segments expressing the jobs are arranged in the previously given order of listing the jobs (in this case, in alphabetical order) in a direction perpendicular to the time axis. Concretely, the operation process chart of FIG. 18 can be obtained in such a way that, in the job, arrangement processing in FIG. 2, all the jobs are arrayed in alphabetical order so as to assign Nos. to the respective jobs successively from the head job, and that the Nos. are set as the y-coordinate values of the jobs. Also in such a case, any of the densities of lines, the colors of lines, etc. can be adopted in order that the jobs lying on a critical path may be clearly indicated as a group. Besides, in case of displaying the jobs lying on the critical path on a CRT, they can be indicated using any of the brightnesses of lines, a blink, etc. In this embodiment, especially the segments expressive of the jobs are arrayed in the previously given order of listing the jobs, so that the correspondence between the jobs and the schedules thereof can be taken with ease. Therefore, when it has become necessary to adjust the process of a certain specified job, the segment expressive of this job can be quickly searched out by referring to the job list.

Incidentally, the operation process charts based on the operation process indicating method in the present invention as described above are displayed on two-dimensional planes by the use of display units such as the CRT. In case of displaying a three-dimensional or cubic pattern, any of the display units merely indicates the pattern three-dimensionally as a plan view obtained by projecting this pattern on the two-dimensional plane, and hence, it is subject to limitation for handling information expressed in three dimensions. However, if it becomes possible to employ a display unit capable of indicating the cubic pattern is a three-dimensional image, the three-dimensional information can be expressed as the cubic pattern by the use of the operation process chart according to the present invention. By way of example, one axis for expressing the numbers of persons required for the jobs is defined, whereupon the operation process chart according to the present invention can be displayed in three dimensions as the cubic pattern which involves the three axes of a time axis, an axis expressing job names and the axis expressing the numbers of persons. Using this cubic pattern, rich guide information items can be offered in process planning, and it is therefore permitted to conduct the operations of creating and revising an operation process more efficiently.

A critical path and the job routes of jobs other than jobs lying on the critical path are calculated from the individual jobs, the working periods of time of the respective jobs and the sequential relations of the jobs, and as to a time axis and an axis of ordinates orthogonal thereto, the critical path and the job routes are indicated in parallel with the time axis in such a manner that each of the jobs included in them is expressed by a segment both the ends of which correspond to the earliest start time and latest completion time of the pertinent job and that the earliest start time on the segment and the latest completion time on a segment expressive of the job preceding the pertinent job are connected by a segment, whereby the mutual relations of the jobs become definite, and in adjusting the period of time of the process of a certain job, influence which the adjustment exerts on the other jobs can be quantitatively grasped by vision, so that an appropriate operation process is obtained.

We claim:

1. In an operation process indicating method to be carried out by a computer for indicating an operation process formed of a plurality of jobs each of which has one or more preceding jobs including also a case where a job itself becomes a most preceding job, and each of which has a predetermined working period of time, an operation process indicating method comprising the following steps performed by a computer:

setting a start and an end of an operation process and points of contacts between jobs as coupling points, and calculating an earliest time and a latest time at which a job immediately succeeding each of said coupling points can be performed earliest and latest following the start of said operation process, respectively;

fetching data representing all the coupling points the earliest times and the latest times of which are equal, and creating a critical path in which these coupling points are arrayed in an order of earliness in time and with job names of the corresponding jobs held between the respectively adjacent coupling points;

calculating with said computer all job routes which start from one coupling point lying on said critical path and return again to another coupling point lying on said critical path after one or more of the jobs not lying on said critical path has/have been performed;

calculating as to each of said job routes, a job route length which is a difference between the earliest time of said other coupling point and that of said one coupling point; and displaying on a display device one axis as a time axis and another axis orthogonal thereto as an axis of ordinates, expressing a certain one of the jobs in the form of a segment which is parallel to said time axis and in which two points of an earliest start time and a latest completion time of the job are respectively denoted by time coordinates as end points, arranging said critical path and said respective job routes at coordinates of said axis of ordinates at predetermined intervals in consideration of the job route lengths in such a manner that said segment does not overlap a segment expressing another of the jobs, and connecting the end point denotative of the earliest start time on said segment expressive of the job and the end point indicating the latest completion time on the segment expressive of the job immediately preceding the former job, through the coupling point of said former job and its preceding job, and thus indicating them.

2. A method as defined in claim 1, characterized in that said critical path is indicated in distinction from said respective job routes on the display device.

3. An operation process indicating method as defined in claim 1 or claim 2, characterized in that said critical path is indicated on an identical straight line on the display device.

4. An operation process indicating method as defined in claim 3, characterized in that the segments expressing the jobs are arranged and indicated on the display device at predetermined intervals in a direction of said axis of ordinates in accordance with a predetermined order of said jobs.

5. An operation process indicating method as defined in claim 4, characterized in that the working periods of time of the jobs are clearly indicated on the segments expressing said jobs as displayed on the display device.

* * * * *